(12) United States Patent
Keene

(10) Patent No.: US 6,502,936 B2
(45) Date of Patent: Jan. 7, 2003

(54) VISION FACILITATION APPARATUS AND METHOD

(76) Inventor: Bradford J. Keene, 1000 S. Catalina Blvd., #302, Redondo Beach, CA (US) 90277

( * ) Notice: Subject to any disclaimer, the term of this patent is extended or adjusted under 35 U.S.C. 154(b) by 0 days.

(21) Appl. No.: 10/021,640

(22) Filed: Dec. 12, 2001

(65) Prior Publication Data

US 2002/0071090 A1 Jun. 13, 2002

Related U.S. Application Data

(60) Provisional application No. 60/255,695, filed on Dec. 13, 2000.

(51) Int. Cl.[7] .............................. G02C 1/08; G02C 1/00
(52) U.S. Cl. .......................... 351/41; 351/95; 351/158; 351/140
(58) Field of Search ............... 351/41, 56, 83, 351/90, 92, 95, 140, 158

(56) References Cited

U.S. PATENT DOCUMENTS

| | | | | |
|---|---|---|---|---|
| D44,759 S | * | 10/1913 | Foster | D16/302 |
| D173,637 S | * | 12/1954 | Brown | D16/302 |
| 5,604,548 A | * | 2/1997 | Kanbar | 351/56 |
| 5,793,462 A | * | 8/1998 | Sample et al. | 351/41 |
| 5,949,516 A | * | 9/1999 | McCurdy | 351/158 |
| 6,033,068 A | * | 3/2000 | Spilkin et al. | 351/41 |

\* cited by examiner

Primary Examiner—Huy Mai

(57) ABSTRACT

Apparatus for facilitating and improving vision, and specifically reading or near vision. The apparatus is configured for facilitating vision from one eye of a user. The apparatus includes a lens coupled to a holding mechanism. The lens is formed of a size, shape and power that improves a substantially complete area of vision from the one eye when provided close to the one eye. The holding mechanism includes a first portion adapted to be coupled to or to hold the lens. The holding mechanism includes a second portion that is adapted for being held between two fingers of the user. The holding mechanism second portion can be formed with an aperture, for attaching to another object. The present invention provides a convenient, small, and personal apparatus for facilitating vision in situations where such vision could be impaired.

20 Claims, 2 Drawing Sheets

VISION FACILITATION APPARATUS AND METHOD

RELATED APPLICATIONS

This application claims priority under 35 U.S.C. §119(e) to U.S. Provisional Application Ser. No. 60/255,695, filed Dec. 13, 2000, entitled "Vision Facilitation Apparatus and Method," which is herein incorporated by reference in its entirety.

BACKGROUND OF THE INVENTION

1. Field of the Invention

The present invention relates to vision facilitating devices. More specifically, the present invention provides for an apparatus for facilitating vision from one eye of a user, and method for making the same.

2. Description of the Related Art

The present invention relates to vision facilitating devices. More specifically, the present invention provides for an apparatus for facilitating vision from one eye of a user, and method for making the same.

A person's vision, or eyesight, can become impaired. Vision may degenerate over time or eyesight can become degraded due to illness, disease, accident or other ailment. Age-related vision degradation usually leads to a diminished near-vision, which renders text and close-up small items very difficult to see. To remedy this circumstance, a person can wear eyeglasses, which include reading glasses or traditional prescription eyeglasses. Eyeglasses are well known devices that are made with two lenses held by a frame, which must be arranged for being supported over the user's nose, and which further include a pair of arms that bridge over the user's ears to aid in holding the eyeglasses in place.

An environment may also lead to permanently or temporarily impaired vision, such as a low light level, or a small object that must be viewed. Well known remedies for these situations include, as before, wearing eyeglasses or reading glasses, or using a magnifying glass. A magnifying glass usually has a single magnifying lens adapted for being positioned close to the thing being viewed, and coupled with a handle that is adapted for being held in the user's hand. A magnifying glass is held close to an object to magnify a view of that object. Accordingly, only a small area of sight is improved by using a magnifying glass. All other areas of sight will remain impaired.

In either instance, a person cannot always carry with him or her a magnifying glass or eyeglasses. Such devices are easily forgotten or misplaced, or too inconvenient to carry. Further, the utility of a magnifying glass is limited to the small area directly beneath the magnifying lens and, therefore, is not usually considered a necessary accessory. Further still, fashion trends of modern society may sometimes dictate against the use of such devices in social situations. Lastly, most eyeglasses, and to some extent most magnifying glasses, are of a size which can be easily broken in, or unwieldy for, common or repetitive uses.

SUMMARY OF THE INVENTION

The invention relates to an apparatus for improving and facilitating a user's vision, particularly near vision and reading vision. In an embodiment, the apparatus is small, convenient to carry and use, and is of resilient manufacture. In accordance with a particular embodiment, an apparatus facilitates vision from one eye of a user. The apparatus includes a lens bounded by two side surfaces. The lens is adapted to be held close to the eye for improving a substantially complete area of vision from the eye. The apparatus further includes a holding mechanism. The holding mechanism has a first portion configured to fully or at least partially frame the lens, and a second portion adapted to extend from the first portion in the general plane of the lens. The second portion is further sized and adapted to be held between two fingers of the user.

In accordance with another embodiment of the invention, a method of forming a device configured for facilitating vision from one eye of a user includes the steps of forming a lens of a size, shape and power that improves a substantially complete area of vision from the one eye when provided close to the one eye, and connecting a holding mechanism to the lens. The method further includes the step of forming a tab with a portion of the holding mechanism. In a particular embodiment, the tab is configured for being held between two fingers of the user.

DETAILED DESCRIPTION OF THE PREFERRED EMBODIMENTS

The figures and the accompanying description below are examples of the preferred embodiment of the present invention and a few variations. A person of skill in the art will understand that many of the specific details of the embodiments shown here can be varied without departing from the novelty of the invention.

Figure 1:
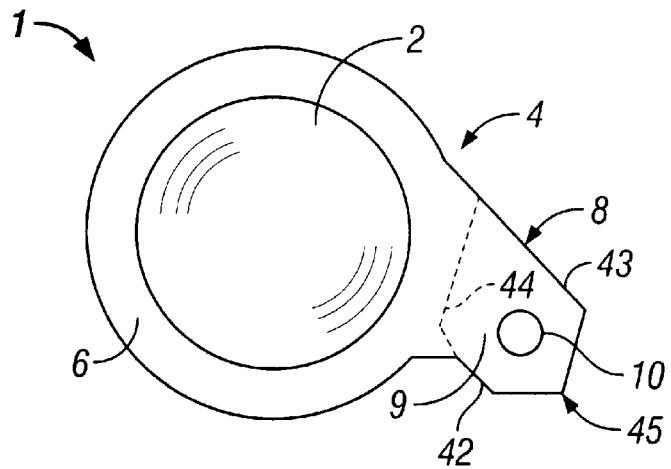
FIG. 1 is a front view of a vision facilitating apparatus, in accordance with an embodiment of the present invention.

FIG. 1 shows an apparatus 1 for facilitating vision, in accordance with the invention. Preferably, the apparatus 1 facilitates and improves near and reading vision, and as such is adapted for being positioned close to one eye of a user. The apparatus 1 includes a lens 2 and can include a holding mechanism 4. The lens 2 is formed of a size and shape, and has a power to improve a substantially complete area of vision from the one eye of the user. Thus, when positioned close to the one eye, the lens 2 improves nearly the entire range of vision out from that eye, to clarify any object within that range of vision. A shape of the lens 2 includes, but is not limited to being, circular, or any other shape that includes at least a portion that facilitates a user's vision. Thus, the lens 2 can be formed in alternative shapes and configurations, consistent with the principles of the invention.

The holding mechanism 4 includes a first portion 6 that is sized to accommodate the lens 2, and hold the lens. The holding mechanism 4 further includes a second portion 8 coupled with the first portion 6, and sized and configured for being held by a user. The second portion 8 is preferably sized for being grasped between two fingers of the user. However, when the holding mechanism 4 or apparatus 1 is coupled to another object, the apparatus 1 could be held by the user, via the second portion 8, in accordance with other practices, such as the user grasping the other object, etc. The holding mechanism can be substantially flat and extended in the plane of the lens 2.

In one exemplary embodiment of the invention, the second portion 8 includes a subportion 9. The subportion 9 forms a part of the second portion 8 for being held by the user. In a specific embodiment, the subportion 9 is trapezoidal, having a first parallel side 42 and a second parallel side 43 that is longer than the first parallel side 42. The subportion 9 is further defined by a first end 44 coupled to the holding mechanism first portion 6, and a second end 45 defining a space or boundary between the first and second parallel sides 42, 43. In the specific embodiment, the holding mechanism is Q-shaped.

The second portion 8 can also include an aperture 10, formed in the surface of the second portion 8. The aperture 10 can also be formed to have any shape. The aperture is adapted for being threaded by a ring, chain, or any other member which can attach to another object. In one embodiment of the invention, for example, the aperture is adapted to receive a pin, and the pin is also threaded through a container that is sized for holding the vision facilitating apparatus. The lens can be withdrawn from and reinserted into the container by rotating the apparatus about the axis of the pin.

According to one embodiment, the lens 2 has a diameter of approximately 1 inch. The holding mechanism first portion 6, when entirely circumscribing the lens, has an outer diameter of approximately 1.16 inches. The holding mechanism second portion 8 extends from the first portion 6 by approximately 0.3 inches. These measurements are merely exemplary. In an embodiment, the holding mechanism is formed into a unitary piece based on a single mold, so that the lens 2 may be simply snapped into place in the holding mechanism first portion.

Figure 2A:
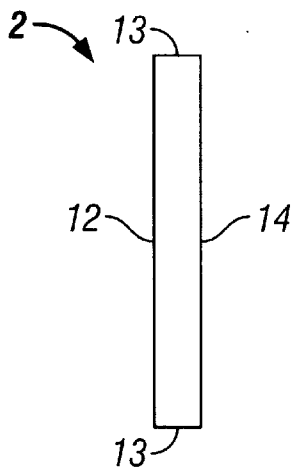
FIGS. 2A and 2B show side views of alternative embodiments of a lens according to an embodiment.
Figure 2B:
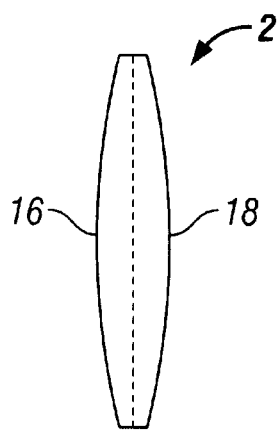

Referring now to FIGS. 2A and 2B, there are shown several embodiments of a lens 2. In FIG. 2A, the lens 2 is defined by a circumferential edge 13 bounded by a two side surfaces 12 and 14. In one embodiment of the invention, a first side surface 12 and the second side surface 14 are planar. However, one of the side surfaces can have a curvature. The power or magnification of the lens 2 is such that, when positioned closer to one eye of a user than an object being viewed, vision within a substantially total range of sight from the one eye is improved.

In a specific embodiment, the lens power is between 2.0 and 4.5 diopters. In a specific exemplary embodiment, the power is between 3.0 and 3.5 diopters, which is a level of magnification that is suitable for nearly all users. This diopter power range enables a user to position the lens to the eye and see an entire reading or viewing area, or in other words, facilitates and improves vision for the entire range of sight.

FIG. 2B shows an alternative embodiment of the lens 2 in which both a first side surface 16 and a second side surface 18 have curvatures. In the embodiment, a combination of the curvatures is sufficient to produce a desired strength of optic magnification, or power, as described above. Further still, one side surface may be concave while the other side surface may be convex. Those skilled in the art would recognize that any combination of curvature or planarization which yields a desired optic strength is within the scope of the invention, so long as the lens 2 is formed of a relatively thin piece of material.

The lens 2 may be formed of a material which includes glass, plastic, acrylic, or the like. Also, a coloring may included in the formation of the lens for filtering certain wavelengths of visible light. For instance, the lens could be yellow to aid vision in dark environments, brown to aid vision in bright environments, or another color for maximum eye comfort. Further, the lens may be inscribed with a colored pattern, icon or logo.

Figure 3:
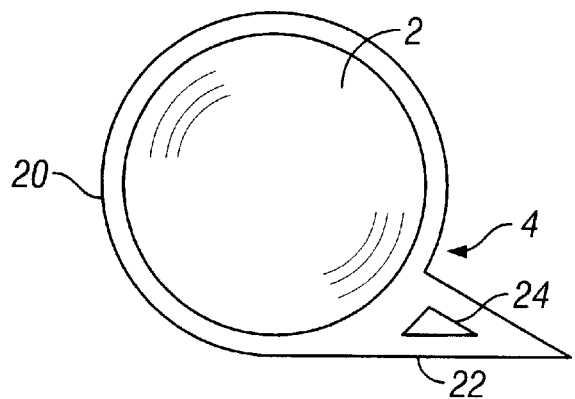
FIG. 3 is a front view of a vision facilitating apparatus according to an alternative embodiment of the invention.

FIG. 3 shows an alternative configuration of the vision facilitating apparatus, for illustrating that the apparatus according to the invention can have any form or shape. In the embodiment shown, the lens 2 is circular, but can be any shape or polygon. The holding mechanism 4 includes a narrow first portion 20 that completely circumscribes the lens, but in other embodiments such first portion 20 can partially circumscribe the lens, or the holding mechanism 4 could even not include a first portion 20. A second portion 22 is coupled to the first portion 20 in one embodiment, but in other configurations could be attached directly to the lens 2. The second portion 22 is shown as having an angular shape, in this case being a triangle. An aperture 24 is formed in the second portion 22, and can take a similar or different general shape as the second portion 22.

Figure 4:
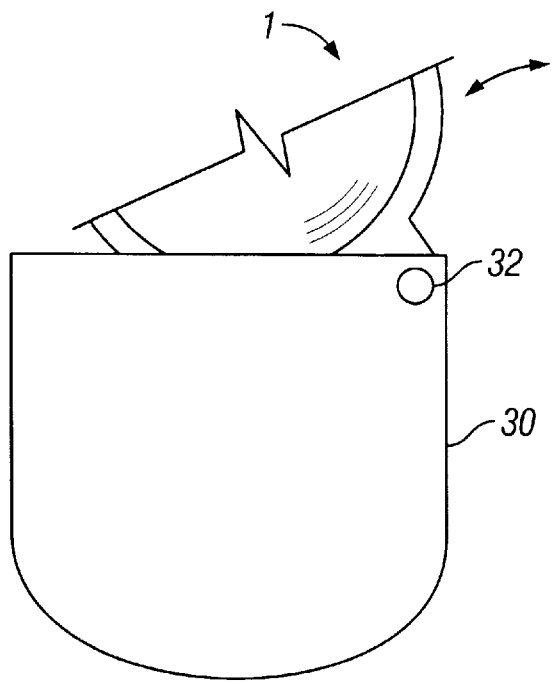
FIG. 4 illustrates a container for a vision facilitating system.

FIG. 4 illustrates a container 30, in which the vision facilitating apparatus 1 may be contained, and from which the apparatus 1 can be swiveled or sprung. As described above, the apparatus 1 is coupled to the container 30 via a pin 32, which in one embodiment is coupled through both a corner of the container 30 and the apparatus 1. In other embodiments, the mechanism by which the apparatus 1 is attached to the container could be a ring, a bar, a hook, or any other suitable member.

Figure 5:
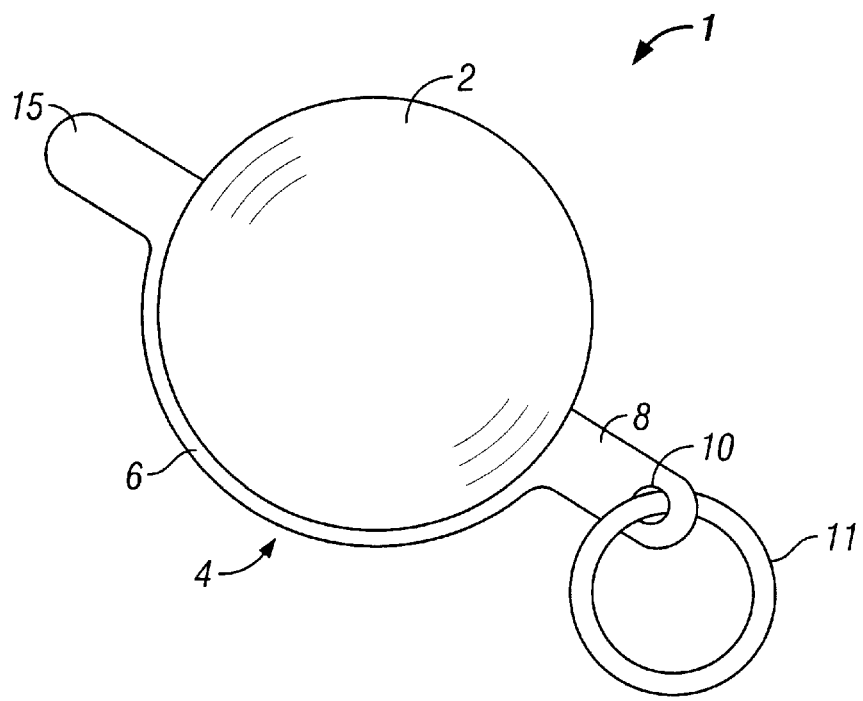
FIG. 5 shows another embodiment of a vision facilitating apparatus.

FIG. 5 shows an alternative exemplary embodiment of the present invention, in which an apparatus 1 includes a lens 2 and a holding mechanism 4 for holding the lens 2. In the embodiment shown, the holding mechanism 4 includes a first portion 6 that partially circumscribes the lens 2. The holding mechanism 4 may thus be snapped or temporarily bent into place around the lens 2. A second portion 8 extends from the first portion 6, preferably in the same general plane as the lens 2 and/or the first portion 6. A third portion 15 of the holding mechanism is preferably sized and adapted to be held between two fingers of a user, to provide an alternative mechanism by which the apparatus 1 may be positioned to a user's eye. A size of the third portion 15 may be complementary to a size of the second portion 8.

The second portion 8 includes an aperture 10, which is sized and adapted for receiving a securing mechanism 11. The securing mechanism 11 can be formed of any member which can be suitably attached to the aperture 10 of the apparatus 1. Examples of the securing mechanism include a ring found with conventional key ring assemblies, a chain, or a pin.

In summary, the preferred embodiments described above allow for an improved vision facilitating apparatus and method of its manufacture. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An apparatus for facilitating vision of a user, comprising:
   a lens for improving vision of the user when positioned near an eye of the user; and
   a holding mechanism, including a first portion at least partially framing the lens and a second portion extending from the first portion for being controlled by the user to position the first portion and lens near the eye.

2. The apparatus of claim 1, wherein the holding mechanism second portion includes an aperture.

3. The apparatus of claim 2, further comprising a key chain, coupled to the holding mechanism second portion through the aperture.

4. The apparatus of claim 1, wherein the holding mechanism second portion includes a subportion having a first edge and a second edge that is longer than the first edge, and further including a first end coupled to the holding mechanism first portion and a second end defining a space between the first and second sides.

5. The apparatus of claim 4, wherein the subportion forms a trapezoid.

6. The apparatus of claim 4, wherein the subportion includes an aperture.

7. The apparatus of claim 1, wherein the holding mechanism first portion circumscribes the lens.

8. The apparatus of claim 1, wherein the lens is substantially circular.

9. The apparatus of claim 1, wherein the two side surfaces of the lens are substantially planar.

10. The apparatus of claim 1, wherein the lens has a power that is between 2.0 and 4.5 diopters.

11. The apparatus of claim 10, wherein the power is between 3.0 and 3.5 diopters.

12. The apparatus of claim 1, wherein the lens is formed with glass.

13. The apparatus of claim 1, wherein the lens is formed with plastic.

14. The apparatus of claim 1, wherein the lens is formed with acrylic.

15. The apparatus of claim 1, wherein the holding mechanism second portion is configured for being held between two fingers of the user.

16. A system for facilitating vision from one eye of a user, comprising:

a lens having two side surfaces for enhancing vision when positioned close to the eye;

a holding mechanism, including a first portion at least partially framing the lens and a second portion extending from the first portion in the plane of the two side surfaces, the second portion for being held between two fingers of the user and including an aperture; and a container, connected to the second portion via a connector coupled through the aperture, for containing the holding mechanism and the lens.

17. A method of improving near or reading vision from one eye of a user, comprising:

providing a lens of a size, shape and power that improves a substantially complete area of vision from the one eye when positioned close to the one eye;

connecting a holding mechanism to the lens; and forming a tab with a portion of the holding mechanism, wherein the tab is configured for being held between two fingers of the user.

18. The method of claim 17, wherein the power is between 3.0 and 3.5 diopters.

19. The method of claim 17, further comprising forming an aperture in the tab.

20. The method of claim 19, further comprising coupling a key chain through the aperture.

* * * * *

(12) EX PARTE REEXAMINATION CERTIFICATE (6216th)
United States Patent
Keene

(10) Number: US 6,502,936 C1
(45) Certificate Issued: Apr. 29, 2008

(54) VISION FACILITATION APPARATUS AND METHOD

(76) Inventor: Bradford J. Keene, 1000 S. Catalina Blvd., #302, Redondo Beach, CA (US) 90277

Reexamination Request:
No. 90/006,757, Sep. 24, 2003

Reexamination Certificate for:
Patent No.: 6,502,936
Issued: Jan. 7, 2003
Appl. No.: 10/021,640
Filed: Dec. 12, 2001

Related U.S. Application Data

(60) Provisional application No. 60/255,695, filed on Dec. 13, 2000.

(51) Int. Cl.
*G02C 1/08* (2006.01)
*G02C 1/00* (2006.01)

(52) U.S. Cl. ............... 351/41; 351/95; 351/140; 351/158

(58) Field of Classification Search ............ 351/41, 351/95, 140, 158, 56, 83, 90, 92
See application file for complete search history.

(56) References Cited

U.S. PATENT DOCUMENTS

| | | | | |
|---|---|---|---|---|
| D44,759 S | * | 10/1913 | Foster | |
| 2,682,805 A | * | 7/1954 | Tomasovic | 359/509 |
| 3,007,566 A | * | 11/1961 | Morris | |
| 6,033,068 A | * | 3/2000 | Spilkin et al. | |

* cited by examiner

*Primary Examiner*—Hung X Dang

(57) ABSTRACT

Apparatus for facilitating and improving vision, and specifically reading or near vision. The apparatus is configured for facilitating vision from one eye of a user. The apparatus includes a lens coupled to a holding mechanism. The lens is formed of a size, shape and power that improves a substantially complete area of vision from the one eye when provided close to the one eye. The holding mechanism includes a first portion adapted to be coupled to or to hold the lens. The holding mechanism includes a second portion that is adapted for being held between two fingers of the user. The holding mechanism second portion can be formed with an aperture. for attaching to another object. The present invention provides a convenient, small, and personal apparatus for facilitating vision in situations where such vision could be impaired.

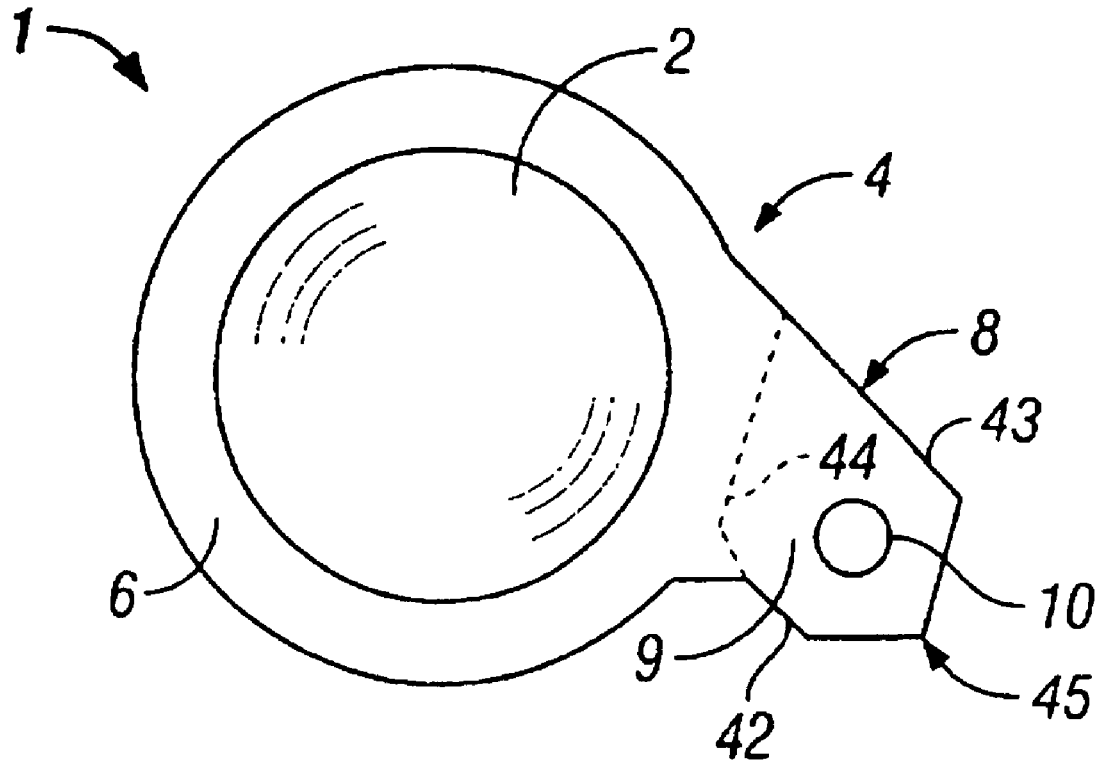

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–20 are cancelled.

\* \* \* \* \*